United States Patent
Gregorovic

[15] 3,675,283

[45] July 11, 1972

[54] ATTACHMENT DEVICES FOR ELONGATE MEMBERS

[72] Inventor: Dragutin T. Gregorovic, 1, quai Marcellis, Liege, Belgium

[22] Filed: Oct. 2, 1970

[21] Appl. No.: 77,422

[52] U.S. Cl. ........................................24/73 SA, 248/74 B
[51] Int. Cl. ........................................A44b 21/00, F16l 3/12
[58] Field of Search ...........24/73 SA, 243 CR, 259 C, 248 L, 24/259 RC; 85/5; 16/159; 248/74 C, 73, 71, 74 B, 216, 221, 74

[56] References Cited

UNITED STATES PATENTS

| | | | |
|---|---|---|---|
| 1,246,325 | 11/1917 | Rohmer | 24/73 SA UX |
| 2,065,843 | 12/1936 | Van Uum | 24/259 RC X |
| 2,829,397 | 4/1958 | Nagy | 16/159 X |
| 3,198,463 | 8/1965 | Loudon | 248/74 X |
| 3,396,930 | 8/1968 | Gregorovic | 248/216 |

FOREIGN PATENTS OR APPLICATIONS

| | | | |
|---|---|---|---|
| 515,183 | 4/1931 | Germany | 248/71 |
| 907,789 | 3/1954 | Germany | 248/71 |

*Primary Examiner*—Donald A. Griffin
*Attorney*—Robert E. Burns and Emmanuel J. Lobato

[57] ABSTRACT

A device for attaching an elongate member to a support surface comprises an anchoring part for penetrating a hole in the support surface and a clamping part for engaging the elongate member. The device is a one-piece item made from resilient strip material. The anchoring part has a generally elongate tubular shape and is connected at a trailing end to the clamping part. The clamping part includes two portions, each having a semi-circular cross-section in a direction at right-angles to the anchoring part. One portion is bendable to grip an elongate member between the portions. Means are provided for locking the one portion in the gripping position.

10 Claims, 6 Drawing Figures

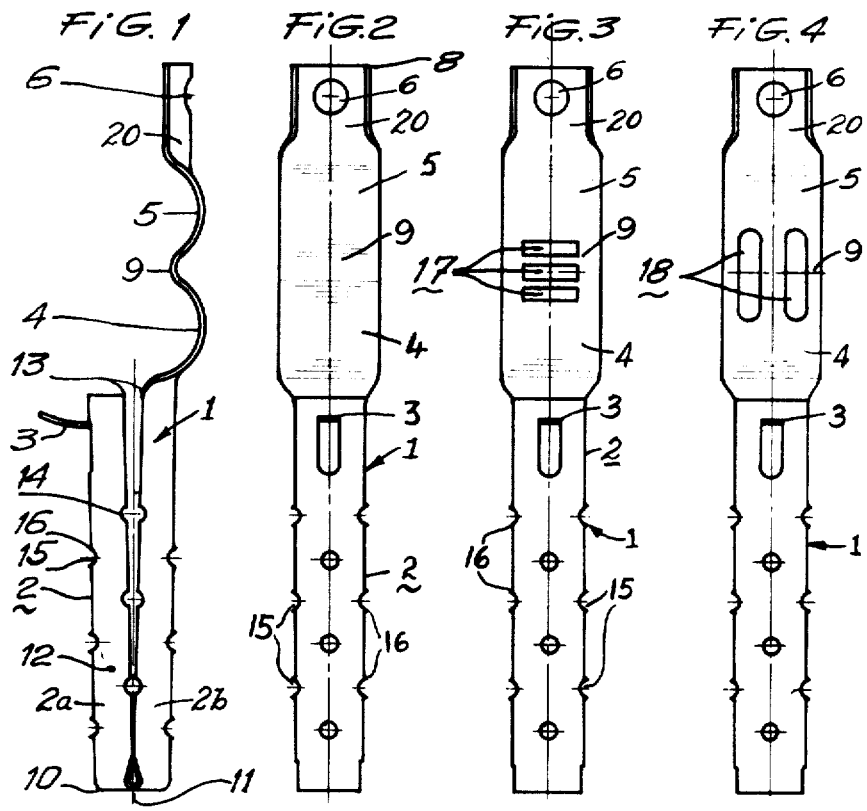

ATTACHMENT DEVICES FOR ELONGATE MEMBERS

BACKGROUND OF THE INVENTION

The present invention relates to devices for attaching elongate members to support surfaces. The expression "elongate members" when used throughout this specification, is intended to cover such members as pipes, tubes, ducts, cables, conduits and the like.

Numerous devices are known for attaching elongate members to the surfaces of walls made of concrete, metal or brick. These known devices include a plurality of parts such as clamps, pins, screws, bolts, nuts and the like. Clearly, a plurality of parts increases the risk of a part being lost as well as an increase in the cost of producing and assembling the device.

Often these known devices require that a sealing or adhesive material be employed in order to ensure a permanent fixing of the device to the wall. The time required to deposit a sealing material in a drilled hole in the wall and the time required to wait for the sealing material to dry before finally attaching an elongate member, is long and uneconomic. Often, when a sealing material is used, the surface surrounding the fixing element is stained or damaged and has to be made good, for example, by smoothing the surface with an abrasive such as sandpaper.

AIMS OF THE INVENTION

An object of the present invention is the provision of a device for attaching an elongate member to a support surface which device comprises a single element made from resilient strip material.

Another object of the present invention is the provision of a device for attaching an elongate member to a support surface which device requires no sealing or adhesive means for maintaining the device in a hole in the support surface.

According to the present invention, a unitary device for attaching an elongate member to a support surface, the device being made of resilient strip material, comprises an anchoring part for penetrating a hole in the support surface, and an integral clamping part for engaging the elongate member, the anchoring part having a generally elongate tubular configuration and being attached by a trailing end to a first portion of the clamping part, the clamping part including a second portion, the first and second portions each having a symmetrical cross-section about an axis extending in a direction transverse to the anchoring part, and being interconnected by a transition portion, the second portion being bendable about the transition portion into a clamping position for gripping the elongate member between the first and second positions, and means on the second portion for engaging means on the anchoring part, when in the clamping position, for locking the second portion in the clamping position.

Preferably, the first and second portions each have a generally semi-circular cross-section in a direction transverse to the anchoring part.

DESCRIPTION OF THE FIGURES OF THE DRAWING

Embodiments of the invention will now be described, by way of example, reference being made to the Figures of the accompanying drawings in which:

FIG. 1 is a side elevation of a device according to the invention;

FIG. 2 is a plan view of the device of FIG. 1;

FIG. 3 is a plan view of a modified device according to the invention;

FIG. 4 is a plan view of another modified device according to the invention;

FIG. 5 is a diagrammatic, partially sectional side view of the device of FIG. 1, attached to a support surface and supporting a pipe; and FIG. 6 is a plan view of the device of FIG. 5.

DESCRIPTION OF PREFERRED EMBODIMENTS

As shown in FIGS. 1 and 2, a unitary device 1 for attaching an elongate member, such as, pipe, tube, duct, cable or conduit, to a support surface, comprises an anchoring part 2 and an integral clamping part. The device 1 is formed from resilient strip material such as mild steel or any material.

The anchoring part 2 has a generally elongate tubular configuration of generally circular cross-section with two parts 2a, 2b, extending around a longitudinal axis 11.

The leading end 10 of the anchoring part 2 is closed and the anchoring part 2 tapers from the larger dimensional trailing end to the smaller dimensional leading end 10.

The opposed edges 13 of the two parts 2a, 2b define an open slot or seam which tapers from the trailing to the leading end 10 of the anchoring part 2. Spaced apertures 14 are provided along the length of the seam in the marginal edge portions of the two parts 2a, 2b.

Spaced holes 15 are formed in the anchoring part 2, which holes 15 have peripheral flanges 16 extending outwardly from the anchoring part 2.

The part 2a has a bendable tab or tongue 3 projecting outwardly therefrom adjacent the trailing end.

The clamping part is formed from resilient strip material and includes a first clamping portion 4 attached to the trailing end of the part 2b. The first clamping portion 4 is interconnected with a second clamping portion 5 by a bendable transition portion 9. The transverse cross-section of the portions 4, 5 are generally semi-circular. A tail part 20 extends rearwardly from the portion 5 and has a through hole 6.

Referring now to FIGS. 5 and 6, when it is required to attach a pipe or tube 19 to a surface of a wall 21, a hole or bore 22 is made in the wall, which hole opens into the surface of the wall 21. The anchoring part 2 is forced into the hole 22, the longitudinal slot or seam closing as the part 2 is compressed radially inwardly on being forced farther into the hole 22. The anchoring part 2 is forced into the hole 22 a distance corresponding to the required distance between the surface of the wall 21 and the pipe 19. The engagement of the anchoring part 2 can be made without a cement or sealing material in the hole 22, the maintenance of the part 2 in the hole 22 being assured by the resilience of the tapered anchoring part 2 expanding against the hole 22. The flanges 16 further aid in securing the anchoring part 2 in the hole 22.

When the anchoring part 2 is forced into the hole 22, the required distance, the tube 19 is placed in the first clamping portion 4. The second clamping portion 5 is then bent about the transition portion 9 into opposed clamping relationship with the first clamping portion to firmly grip the pipe 19 between the clamping portions 4, 5. The tongue 3 of the locking means is then passed through the hole 6 in the tail part 20 and bend to lock the portion 5 in the pipe engaging or clamping position.

A modified device is shown in FIG. 3, which has all the features of the device of FIGS. 1, 2, 4 and 5 but includes a plurality of spaced elongate apertures extending in and on each side of the transition portion 9, in a direction at right-angles or substantially transverse to the axis 11 of the anchoring part 2.

A further modified device is shown in FIG. 4, which is similar to the device of FIG. 3 except that slots 18 of the device of FIG. 5 extend across the transition portion into the portions 4, 5 parallel to the axis 11 of the anchoring part 2.

Although the above described embodiments have first and second portions of generally semi-circular cross-section in a direction transverse to the anchoring part, any symmetrical cross-section about an axis extending in a direction transverse to the anchoring part could be used for example, a U-shaped cross-section.

In the above described embodiments, the mounting of the device necessitates only the drilling of a single hole in the wall. The insertion of the device which, as soon as it is introduced, can be used as a pricker, is perfectly guided by means of at least the two edges 13. The flanges 16 ensure the maintenance of the anchoring part in the hole, No sealing by a specialized operation is required, therefore the mounting is quick and there is no need to wait while a seal has to set. Despite rigid mounting to the wall, the device, by reason of its resiliency can be removed entirely or partially from its mounting and it is therefor possible to adjust its depth of penetration. The device can also be adjusted in height given the fact that its clamping part is subjected to an eventual distortion.

The clamping part which is provided for engaging the member to be supported can be pierced, allowing a more easy folding according to the materials and dimensions of the clamping part.

The device for attaching pipes, tubes, cables and other elongate members to a support surface can be made by stamping and forming out of strip iron or other suitable material, profiled at its unfolded anchoring part and closed at its extremity by folding and superposition in order to obtain a tube profile of, for example, round, oval, triangle, square section, of any polygonal form, symmetric or not.

What is claimed is:

1. A unitary device for attaching articles to a support surface comprising: a single strip of resilient material configured at one end into anchoring means for adjustably anchoring the device to a support surface and configured at the other end into clamping means for clamping an article to be attached to the support surface; said anchoring means comprising an elongated tubular member having means therein defining a longitudinal slot rendering said tubular member sufficiently resiliently compressible in a radial direction to enable said tubular member to be resiliently compressed and inserted into a bore in the support surface whereby said tubular member may resiliently expand against the bore to adjustably anchor the device to the support surface; said clamping means comprising a first clamping portion connected to an end of said tubular member, a second clamping portion, bendable connecting means interconnecting said first and second clamping portions for enabling them to bend into opposed clamping relationship to clamp therebetween the article to be attached to the support surface; and locking means for locking said clamping portion in said opposed clamping relationship.

2. A unitary device according to claim 1; wherein said tubular member contains on the outer surface thereof a plurality of outwardly extending flanges cooperative together to increase the anchoring effect of said anchoring means.

3. A unitary device according to claim 1; wherein said first and second clamping portions each have a semicircular configuration and form a substantially circular clamp when bent into said opposed clamping relationship.

4. A unitary device according to claim 1; wherein said bendable connecting means comprises a strip portion of said strip of resilient material having means therein defining a plurality of elongated apertures effective to render said strip easily bendable.

5. A unitary device according to claim 4; wherein said plurality of elongated apertures extend in a direction parallel to the longitudinal axis of said tubular member.

6. A unitary device according to claim 4; wherein said plurality of elongated apertures extend in a direction substantially transverse to the longitudinal axis of said tubular member.

7. A unitary device according to claim 1; wherein said tubular member has a leading end, a trailing end connected to said first clamping portion, and wherein said tubular member tapers in cross-section along substantially its entire length from a larger cross-section at said trailing end to a smaller cross-section at said leading end thereby facilitating insertion of said tubular member into the bore.

8. A unitary device according to claim 7; wherein said leading end is closed.

9. A unitary device according to claim 7; wherein said longitudinal slot tapers from a larger slot width at said trailing end to a smaller slot width at said leading end.

10. A unitary device according to claim 1; wherein said locking means comprises a bendable tap projecting outwardly from said tubular member, and means connected to said second clamping portion including means defining an opening for receiving therethrough said tab when said clamping portions are in said opposed clamping relationship whereby said tab may be bent over said opening to effectively lock said clamping portions.

* * * * *